United States Patent

[11] 3,590,657

| | | | | |
|---|---|---|---|---|
| [72] | Inventor | James C. Cochrane, Jr.<br>Raleigh, N.C. | | |
| [21] | Appl. No. | 827,190 | | |
| [22] | Filed | May 23, 1969 | | |
| [45] | Patented | July 6, 1971 | | |
| [73] | Assignee | Walter K. Gladden<br>Charlotte, N.C.<br>a part interest | | |

[54] VARIABLE GEAR TRAIN RATIO
5 Claims, 3 Drawing Figs.

[52] U.S. Cl. ................................................. 74/640
[51] Int. Cl. .................................................. F16h 33/00
[50] Field of Search ...................................... 74/640,
425.5, 793, 393

[56] References Cited
UNITED STATES PATENTS

| 1,227,985 | 5/1917 | Weigel | 74/793 |
|---|---|---|---|
| 3,364,775 | 1/1968 | Sack | 74/425.5 |
| 3,442,156 | 5/1969 | Novinger | 74/425.5 |

*Primary Examiner*—C. J. Husar
*Attorney*—John G. Mills, III

ABSTRACT: In abstract, a preferred embodiment of this invention is a gear train using a generally flat output gear having teeth radiating outwardly from its center area and radially disposed cylinders with longitudinally slidable teeth therein to engage the output gear to vary the output to input gear ratio.

JAMES C. COCHRANE, JR.
INVENTOR.

BY John G. Miller PA
ATTORNEY

JAMES C. COCHRANE JR.
INVENTOR.

VARIABLE GEAR TRAIN RATIO

This invention relates to gearing and more particularly to gear trains of the variable speed transmission type.

In the past, various gear arrangements have been used to vary the output speed of a transmission relative to the input speed. Some of these devices include flat, platelike members with progressively larger rings or bands of teeth radiating progressively from the center thereof with a second gear member slidably mounted adjacent the first member so that the relative output speed can be varied according to which of the radiating bands is in engagement. For means such as bicycles and light agricultural equipment, these transmissions serve their purposes but they are not capable of driving large pieces of equipment having large loads placed thereon since they inherently have to have a certain amount of play between the teeth so that it can operate in conjunction with both the smallest and the largest radiating rings of gears. Also constant power output is not possible since the slidable gear has to be shifted from one ring to the other to change the speed differential thus interrupting the power output during such shift.

After much research and study into the above-mentioned problems, applicant has developed a greatly improved transmission-type-gear train that is capable of handling heavy loads at high r.p.m. speeds with an infinite number of input to output ratios between defined limits. This improved train also allows smooth shifting from one speed to another without loss of power during the shift and is simple in construction and maintenance.

It is an object, therefore, of the present invention to provide a constant engagement variable speed transmissions with an infinite number of gear ratios between high and low output.

Another object of the present invention is to provide in a gear train, a smoothly shiftable gear ratio changing means having constant power output.

Another object of the present invention is to provide a variable speed transmission-type device wherein the ratio between input and output is selectable at any point between the high and low capabilities of the device.

A further object of the present invention is to provide a constant engagement, variable speed transmission of simple construction and low maintenance capabilities.

Another object of the present invention is to provide a heavy load, contact output, variable transmission of improved design and control.

Other objects and advantages of the present invention will become apparent and obvious from a study of the following description and the accompanying drawings which are merely illustrative of the present invention.

Figure 1:
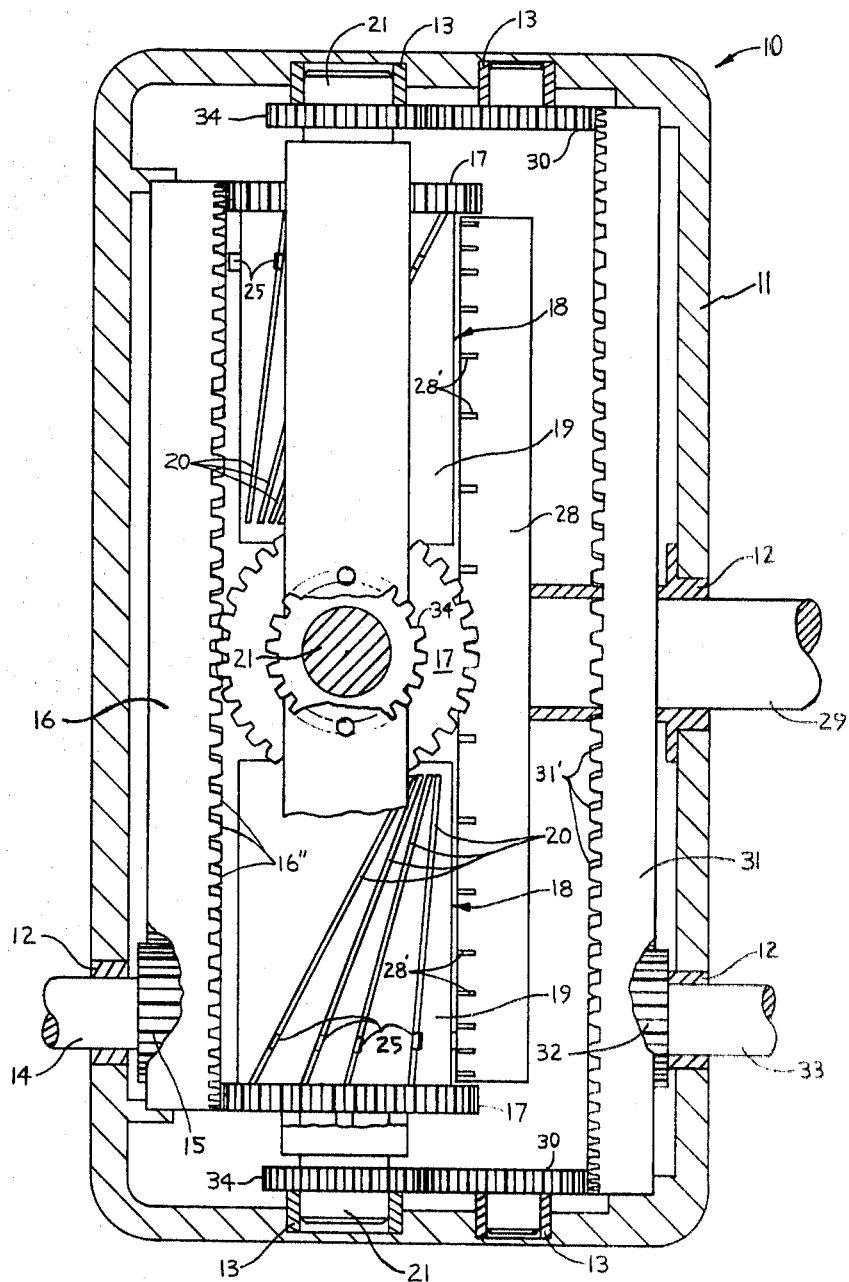
FIG. 1 is a side elevational view of the improved gear train of the present invention.

With further reference to the drawings, the transmission-type-gear train indicated generally at 10 is composed of housing 11 having a plurality of shaft bearings 12 provided therein. Also a plurality of socket bearings 13 are provided as hereinafter set forth in more detail.

Input shaft 14 is attached to a power source (not shown) at one end and is mounted through one of the shaft bearings 12 of housing 11. A drive shaft gear 15 is fixedly mounted on the interior end of shaft 14. This gear is in operative engagement with the interiorly disposed teeth 16' of ring gear 16, particularly as seen FIG. 2.

The crown teeth 16" projecting longitudinally parallel to the axis of rotation of ring gear 16 meshingly engage the drive gears 17 of the variable drive cylinders indicated generally at 18.

Each cylinder 18 is composed of a hollow, cylinder wall 19 having a plurality of radiating slots 20 therein. Centrally disposed within housing 19 is worm gear 21 on which is operatively mounted wheel frame 22. Circumventionally disposed in the outer surface portion of this frame are tow ball bearing channels 23 with a teeth receiving channel 24 therebetween.

Ball bear 23' are mounted in channels 23 to allow smoother longitudinal travel of frame 22 within cylinder 19 as will hereinafter be described in more detail.

Figure 2:
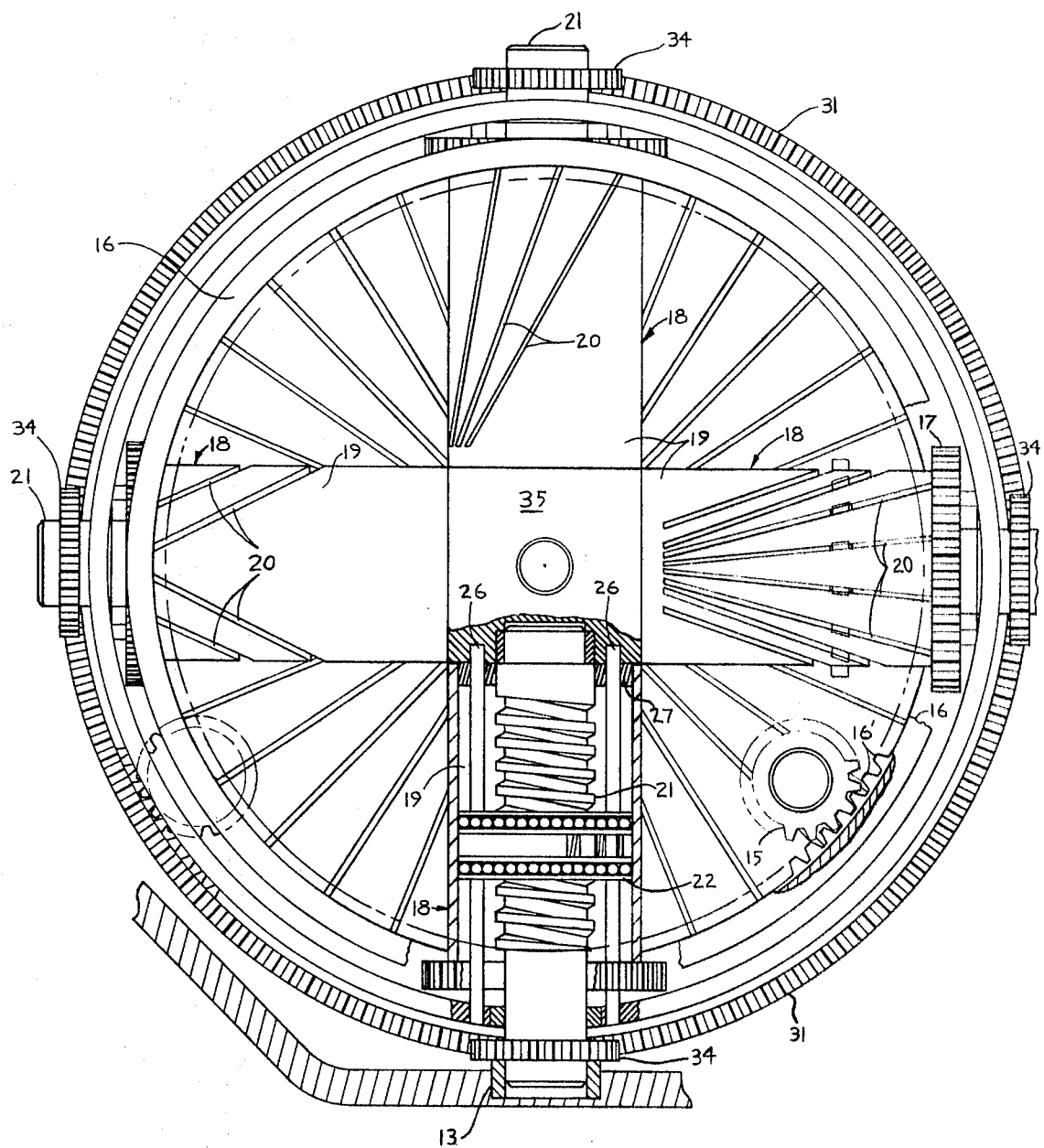
FIG. 2 is an end view showing the relationship of the drive cylinders to the radial gear.
Figure 3:
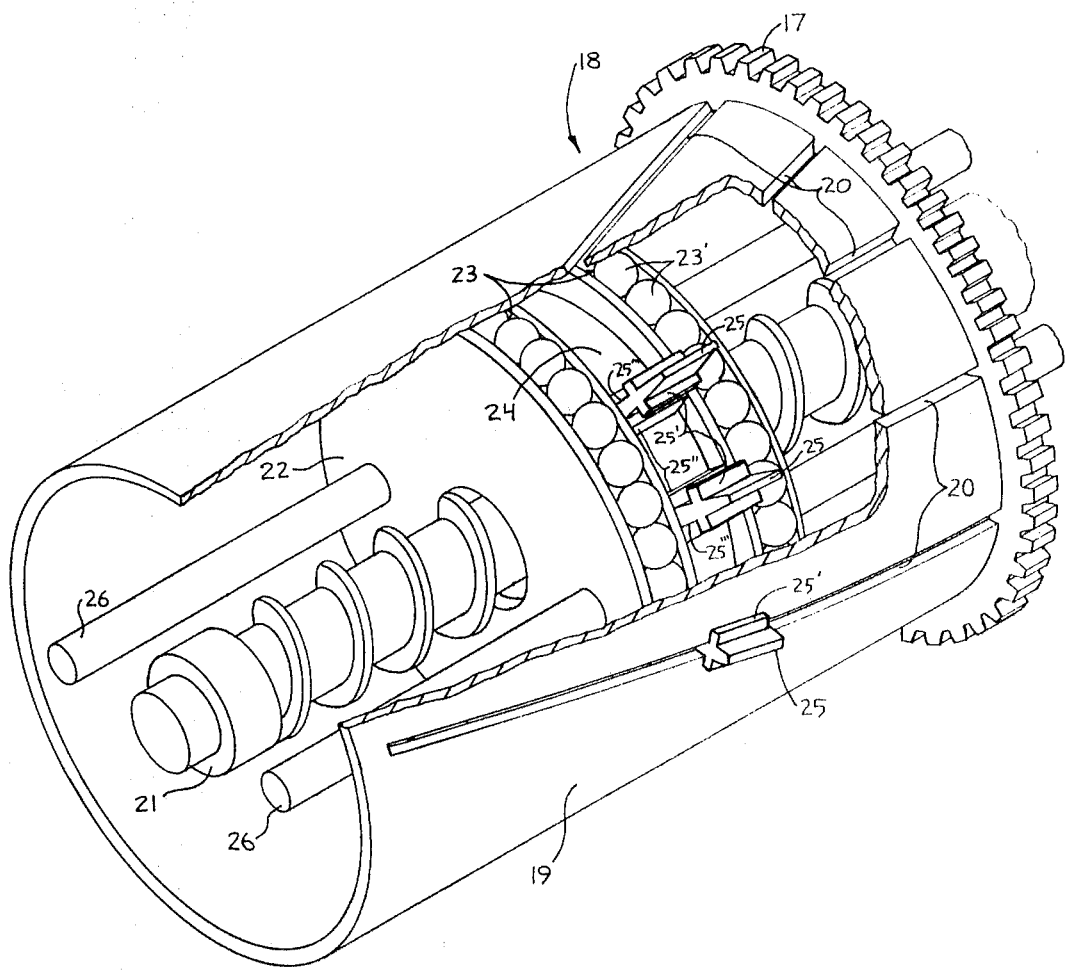
FIG. 3 is an enlarged perspective of a typical cylinder showing the detailed construction thereof.

A plurality of variable spaced teeth 25 corresponding in number to the number of slots 20 in cylinder 18 are slidably mounted in channel 24. Each of these teeth has a slide portion 25' forming an outer shoulder and a slide portion 25" forming an inner shoulder. The waist portion 25''' between the shoulder portions is adapted to slidably receive housing 19 through slots 20, particularly as seen in FIG. 3. An obvious alternate construction would be to eliminate the outer shoulder 25' from each tooth so that only the outwardly projecting teeth 25 are exposed on the outer portion of housing 19, particularly as seen in FIGS. 1 and 2.

So that the wheel frame 22 will move longitudinally back and forth within housing 19 when worm gear 21 is rotated relative to said housing, slide rods 26 slidably pass through said wheel and are fixedly secured to such housing by means such as rod mounting bracket 27.

The radiating slots 20 slidably mounting teeth 25 cover one-quarter of the circumference of each cylinder at their converging ends.

Since the slotted portion of each cylinder is 90° out of phase with its adjoining cylinders, one of such portions is at all times disposed toward radial toothed output gear 28. This allows constant meshing at all times between a portion of the cylinder teeth 25 and gear teeth 28'.

Output gear 28 is fixedly secured to one end of output shaft 29. This shaft passes through housing 11 and is mounted therethrough in one of the housing bearings 12. The end of shaft 29 opposite gear 28 can be operatively attached to means to be driven (not shown).

To rotate worm gears 21 to activate movable teeth mounting wheels 22 longitudinally within their respective cylinders 18, an intermediate gear 30 is rotatively mounted in the socket bearing 13 adjacent each of the worm drive gears 34. One of these last-mentioned gears is fixedly secured to the outer portion of each worm gear. Each of the intermediate gears are adapted to constantly engage their adjacent worm drive gear and the crown teeth 31' of the speed adjusting ring gear 31. The interiorly projecting teeth of this ring gear operatively engage the gear 32 fixedly mounted on the interior end of speed adjusting shaft 33. This shaft is rotatively mounted through one of the housing bearings 12 with its other end attached to a suitable selective source of rotative power (not shown).

Thus, it can be seen that when shaft 33 is rotated in one direction, through gear 32, ring gear 31, gears 34 and worm gears 21 with their respective wheels 22, teeth 25 will move nearer center block 35; and when such shaft is rotated in the opposite direction, said teeth will move away from said block.

In actual operation of the device of the present invention, input rotative speed of a given r.p.m. is applied to input shaft 14. Through gears 15 and 16, cylinders 18 are rotated. These cylinders alternately but constantly drive the radially toothed output gear 28 which causes output shaft 29 to rotate.

When it is desired to change the input to output gear ratio, adjusting shaft 33 is turned to, through gears 32, 31, 30, 34 and worm 21, move the teeth 25 in all of the cylinders 18 either toward or away from the center of radiating toothed gear 28. As the adjustable teeth 25 move toward the center of gear 28, the input to output gear ratio decreases due to the narrow circumference covered by the teeth; but when such teeth are moved outwardly away from the center, the ratio increases due to greater circumference coverage thus giving an infinite number of smoothly changeable ratio adjustments between the limits of high- and low-output limits.

From the above, it is obvious that the present invention has the advantage of providing a simple yet highly efficient variable speed gear train that maintains constant power output during shifts in the input to output ratio. It is obvious that the present invention provides a transmission with an infinite number of speed settings between absolute high and absolute low input-to-output ratio.

The present invention may, of course, be carried out in other ways than those set forth without departing from the spirit and essential characteristics of the invention. The present embodiments are, therefore, to be considered in all respects as illustrative and not restrictive, and all changes coming within the meaning and equivalency range are intended to be embraced herein.

What I claim is:

1. A variable ratio gear train comprising: at least two elongated, generally circular in cross section, ratio adjusting means longitudinally radiating from a central point, each of said means having a plurality of teeth guide means radiating along the surface thereof from narrowly disposed apart adjacent said point to widely disposed apart at the portion farthest from said point; means to rotatively drive said ratio adjusting means; a generally flat output gear means disposed adjacent said gear being rotatable about an axis passing through said point; a tooth means slidably mounted in each of said guide means; means to slide said teeth in unison toward and away from said point; and fixed teeth radiating outwardly from adjacent said axis to adjacent the periphery of said gear and so disposed as to meshingly engage said slidable teeth when the same are disposed at their nearest point to said gear whereby the input to output gear ratio between said drive and said gear may be varied by varying the position of the slidable teeth along the exterior of the ratio adjusting means.

2. The device of claim 1 wherein the elongated, ratio adjusting means is cylindrical in shape.

3. The device of claim 1 wherein the elongated, ratio adjusting means is frustoconical in shape.

4. A variable ratio gear train comprising: a generally flat output gear means having teeth radiating outwardly from the center area adjacent the axis of rotation of said gear; and drive means having teeth for operative meshing engagement with and adjustable along the length of said first-mentioned teeth, said drive means being at least one generally cylindrical shaped member whose longitudinal axis intersects the axis of rotation of said gear, said cylinder having movable teeth slidably supported for travel in radiating paths along the surface thereof extending from the end of said cylinder adjacent the axis intersection toward the opposite end thereof.

5. A variable ratio gear train comprising: a generally flat output gear means having teeth radiating outwardly from a center area adjacent the axis of rotation of said gear, and drive means having teeth for operative meshing engagement with and adjustable along the length of said first mentioned teeth, said drive means being at least one generally frustoconical shaped member whose longitudinal axis intersects the axis of rotation of said gear and whose smaller end lies toward such intersection, said member having movable teeth slidably supported for travel in radiating paths along the surface of such member from said smaller end thereof.